Patented June 6, 1944

2,350,562

UNITED STATES PATENT OFFICE 2,350,562

LUBRICATING OIL AGENT

Eugene Lieber, West New Brighton, Staten Island, N. Y., and Caleb E. Hodges, Elizabeth, N. J., assignors to Standard Oil Development Company, a corporation of Delaware No Drawing. Application February 10, 1942, Serial No. 430,192

9 Claims. (Cl. 252—59)

This invention relates to new oil blending agents, and particularly to the improvement of hydrocarbon lubricating oils by the addition of products synthesized through reaction of metallic sodium with chlorinated paraffinic compounds.

A general purpose of this invention is to provide lubricating oils containing readily formed synthetic products, which even in relatively small proportions exert beneficial influences on the quality of petroleum lubricating oils, such as improvement in viscosity characteristics, resistance to oxidation, and reduction in sludge separation.

To obtain the desired synthetic products for the purpose of this invention, the kinds of organic substances treated with metallic sodium or a similar highly reactive alkali or alkaline earth metal are preferably halogenated paraffinic hydrocarbon materials or organic substances characterized by having a long paraffinic hydrocarbon radical containing halogen substituents. Among the variety of organic materials which may be treated are halogenated derivatives of paraffinic hydrocarbons found in naphtha, kerosene, gas oil, sweater oil, petrolatum, paraffin wax, also waxes of animal, vegetable, or mineral origin. From a practical standpoint, the preferred halogen constituent is chlorine although the other halogens, particularly iodine and bromine, may be present, and the preferred metallic condensing agent is sodium, although other highly electropositive metals, such as potassium or calcium, may be employed. The degree of halogenation or chlorination may vary over a wide range, e. g., 10 to 70% by weight. However, the range of 20 to 50% is the preferred working range. Thus, the halogenated reactants may contain one and more halogen atom substituents linked to carbon atoms in a paraffinic group.

Considered individually, in a preferred reactant for the synthesis, the halogenated paraffinic group has the size of a wax molecule, i. e., contains about 16 to 40 or more carbon atoms, but it is commercially advantageous to use readily available mixtures of halogenated paraffinic compounds which may even contain lower molecular weight alkyl halides or polyhaloalkanes, such as may be obtained from cracked wax distillates. It is important to note, however, that in the synthesis reaction no substantial reaction occurs between the halogenated paraffinic substance and an aromatic hydrocarbon, rather a union of the organic reactants occurs through their aliphatic radicals with elimination of the halogen constituents therefrom, and thus two and even more of the reactants become united into the desired complex synthetic products.

A suitable general procedure for the synthesis is as follows:

The metallic reagent, e. g., clean metallic sodium, is dispersed in a finely divided form into a liquid diluent, such as toluene, at the boiling temperature of toluene. The metallic sodium thus dispersed in a pulverized form is spoken of as "bird shot" sodium. A suitable proportion of this mixture is placed with the halogenated organic reactant and diluent in a reaction vessel fitted with a mechanical stirrer, reflux condenser, and dropping funnel. The reaction of the material in the reaction vessel is started by gently warming, and once the reaction is started, it becomes very vigorous, causing boiling of the diluent. No further heat need be applied; in fact, very often, depending upon the amount of sodium added to the reaction mixture, the reaction vessel must be cooled in order to prevent flooding of the reflux condenser. When the reaction has subsided, additional quantities of the finely divided sodium are added to effect further conversion. When all the metallic sodium has been added, the reaction mixture is refluxed for an additional period and after cooling, a clear solution of the reaction product is separated from the metal halide formed as a by-product of the reaction. The diluent is removed from the reaction product solution by distillation, leaving a viscous oil or resinous material as the product.

The desired reaction is effected satisfactorily at temperatures in the range of about 100° C. to about 150° C., using as the diluent aromatic hydrocarbons, such as toluene or xylene. Depending upon the exact conditions and materials treated, the time required for the reaction ranges from less than about an hour to 10 hours, or more.

The synthesized end product of the reaction, for the sake of simplicity, may be described as a condensation polymer. It is difficult to assign to this product any particular structure or composition, since the halogenated organic substances can become condensed at various places in the halogenated paraffinic chains wherein the halogen substituents have a random distribution. However, it may be observed that the final condensation polymers obtained show either no residual halogen, or only a small fraction of the original halogen content. They are soluble in mineral lubricating oils and have a consistency ranging from that of a viscous oil to that of a gummy resinous or plastic solid.

The condensation polymers thus obtained have been found to be particularly useful as addition agents for mineral lubricating oils for the function of improving the viscosity-temperature characteristics of the oils so as to give the oils a higher viscosity index (reduced viscosity-temperature coefficient). They are very effective in small concentrations of about 0.1% to 10% in this respect. In addition to having the desired enhancing effect on the viscosity characteristics of lubricating oils, these condensation polymers were found to be remarkably stable to heat and oxidation, and accordingly, they may be used when it is desired to formulate various thickened oil compositions.

It may be of interest to note at this point that the condensation polymers described are quite distinctive from polymerization products formed in the reaction of halogenated paraffins with a metal halide catalyst, such as aluminum chloride. In a polymerization with the metal halides, various reactions take place simultaneously, since the metal halides tend to cause unsaturation and cracking. It has been observed that the condensation polymers formed by reacting a halogenated paraffin with metallic sodium do not possess the pour point depressant action of products obtained by reacting the same chlorinated paraffins with aluminum chloride. For the present purposes, the metallic reactant should be at least as electropositive as calcium in the electromotive force series.

For the purpose of illustration, the following experimental data are presented:

Example 1

35 grams of metallic sodium were pulverized in boiling toluene. In another flask, connected with a reflux condenser, were placed 100 grams of chlorinated wax (114° F. M. P. wax, chlorinated to 47% chlorine content). The pulverized sodium in small portions of about 5 grams each was added to the chlorinated wax, with toluene, and the polymerization was started by gently warming the flask. When the toluene was smoothly undergoing refluxing, heating was stopped; and when the reaction subsided, additional quantities of the pulverized sodium were added until all the sodium had been added. The reaction mixture was refluxed for an additional hour, and after cooling, a clear toluene solution of the reaction product was decanted from sodium chloride formed as a by-product. The toluene was removed from the solution by distillation and 15 grams of a viscous gummy oil were obtained as the final desired product.

When 5% of the product, prepared as described above, was blended with a hydrocarbon oil having an initial viscosity index of 114, it was found that the viscosity index was raised to 120. The changes in viscosity at 210° F. were as follows:

|  | S. U. seconds vis./210° F. | V. I. |
| --- | --- | --- |
| Initial oil | 44.4 | 114 |
| Initial oil blended with 5% of condensation-polymer product | 46.0 | 120 |

The pour point of the blend was substantially the same as that of the initial oil.

Example 2

The procedure of Example 1 was followed exactly, except that the following reagents and reactants were used:

|  | Grams |
| --- | --- |
| Metallic sodium | 60 |
| Chlorinated wax (114° F. M. P., containing 54.7% chlorine) | 200 |

The product obtained was 61 grams of a very viscous oil. The following changes in viscosity and viscosity index obtained in blending this product with the same test oil as used in Example 1 were:

|  | S. U. seconds vis./210° F. | V. I. |
| --- | --- | --- |
| Petroleum test oil | 44.4 | 114 |
| Petroleum test oil+5% product of Example 2 | 45.7 | 120 |
| Petroleum test oil+10% product of Example 2 | 47.4 | 125 |

As in Example 1, there were no changes in the pour points of the test oil by the condensation polymer product of Example 2.

Example 3

The procedure of Example 1 was followed with the following modifications:

200 grams of chlorinated wax (114° F. M. P., chlorinated to 47% chlorine content) were dissolved in 350 cc. of toluene. 70 grams of metallic sodium were converted to "bird shot sodium" as described in Example 1. About 200 cc. of toluene were placed in a two liter round bottom flask fitted with a reflux condenser. To the flask were added 50 cc. of the chlorinated wax dissolved in toluene followed by about 5 grams of the bird shot sodium. The mixture was heated gently until the reaction started, then the heat was turned off and the reaction was allowed to proceed by itself until it had subsided. Subsequently, an additional quantity of the sodium was added and the above-described heating and reaction were repeated. When the chlorinated wax was substantially all reacted, another 50 cc. of chlorinated wax dissolved in toluene were added and the above procedure was repeated. When all the chlorinated wax and sodium had been added, the mixture was refluxed by heating for one hour. After the reaction mixture was cooled to room temperature, a clear toluene solution layer was decanted from a sludge layer containing mostly sodium chloride. The sludge layer was washed with fresh toluene, then toluene extract from the washing was added to the main toluene solution. The toluene was removed from the mixture by distillation, leaving 43 grams of sticky, viscous, gummy material, greenish in color, as the final desired product.

The following changes in viscosity and viscosity index were obtained with this product blended in the same test oil as that used in Example 1:

|  | S. U. seconds vis./210° F. | V. I. |
| --- | --- | --- |
| Test oil | 44.4 | 114 |
| Test oil+1.25% product of Example 3 | 45.8 | 122 |
| Test oil+2.5% product of Example 3 | 47.2 | 125 |
| Test oil+5.0% product of Example 3 | 49.2 | 128 |
| Test oil+10.0% product of Example 3 | 56.3 | 133 |

As in Example 1, there were found to be no changes in the pour points by the added product.

The new class of substances described show a very high degree of resistance to oxidation and a remarkably low tendency to form sludge. They find valuable application in "breaking-in oils" and in other uses requiring a high degree of stability. They may be used in compounding greases, insulating oils, and industrial oils. They may be blended with naphthenic or aromatic oils, as well as with highly paraffinic oils or mixed base oils. Other additives, e. g., oiliness agents, antioxidants, pour point depressants, dyes, corrosion inhibitors, other viscosity modifying agents, etc., may be used in the same oil compositions.

It is not intended that this invention be limited by the specific examples nor by any specific mechanism or theory on the synthesis of the new synthetic agents, for it is intended to claim all novelty inherent in the invention as well as equivalents or modifications coming within the scope and spirit of the invention.

We claim:

1. The process which comprises reacting a halogenated non-cyclic paraffinic hydrocarbon material with an elemental metal that is at least as electropositive as calcium, and recovering from the reaction mixture a product soluble in petroleum oils and having therein stable viscosity improving effectiveness.

2. The process which comprises reacting metallic sodium with a chlorinated non-cyclic paraffinic hydrocarbon containing 20 to 50% of chlorine to produce an organic condensation product which is soluble in petroleum lubricating oil.

3. Process which comprises reacting metallic sodium with a halogenated paraffinic hydrocarbon wax under conditions to effect the combination of the sodium with halogen substituents of the wax and form an organic condensation product which is soluble in petroleum lubricating oil.

4. The process which comprises suspending finely divided metallic sodium in an aromatic hydrocarbon diluent boiling within the range of about 100° C. to 150° C., and reacting said metallic sodium in said diluent with chlorinated paraffin wax at the boiling temperature of the diluent until the chlorinated wax is condensed to a substantially higher molecular weight organic product, and separating from the resultant reaction product substances, including sodium chloride, which are insoluble in the diluent.

5. A composition comprising a hydrocarbon oil containing in solution an oil product of a halogenated non-cyclic paraffinic hydrocarbon material reacted with an alkali metal in elemental form.

6. A lubricant comprising a major proportion of a petroleum lubricating oil blended with a minor proportion of a condensation-polymer product of a chlorinated paraffin wax reacted with metallic sodium.

7. A lubricant comprising a major proportion of a lubricating oil blended with about 0.1% to 10% of an oil-soluble condensation product obtained by reacting metallic sodium with chlorinated paraffin wax.

8. As a new composition of matter a condensed hydrocarbon product soluble in petroleum oils and obtained by reacting a halogenated non-cyclic paraffinic hydrocarbon material with an elemental metal which is at least as electropositive as calcium.

9. As a new composition of matter an organic condensation product soluble in petroleum lubricating oil and obtained by reacting metallic sodium with a chlorinated paraffin wax containing 20% to 50% of chlorine.

EUGENE LIEBER.
CALEB E. HODGES.